3,004,041
3-ALLYLOXY-2-METHYL-4H-PYRAN-4-ONE
Henry E. Hennis, Midland, Mich., assignor to The Dow Chemical Company, Midland, Mich., a corporation of Delaware
No Drawing. Filed Sept. 28, 1959, Ser. No. 842,551
4 Claims. (Cl. 260—345.9)

This invention relates to a new chemical compound, 3-allyloxy-2-methyl-4H-pyran-4-one, and to a method for its preparation.

According to the present invention, the novel compound 3-allyloxy-2-methyl-4H-pyran-4-one is prepared by contacting 3-hydroxy-2-methyl-4-pyrone with allyl bromide or allyl chloride, an alkali carbonate or bicarbonate, and an inert solvent; the reaction mixture is then heated, preferably at the reflux temperature, and the desired product, 3-allyloxy-2-methyl-4H-pyran-4-one separated from the reaction mixture by suitable techniques, extraction with an organic solvent such as toluene, benzene, xylene, or diethyl ether being conveniently employed, followed by removal of the organic solvent and purification of the desired product, as by distillation.

Where allyl chloride is used as a reactant, it is preferable to employ catalytic amounts of an alkali iodide, such as sodium or potassium iodide.

There are numerous inert solvents that can be employed; however, acetone, methyl ethyl ketone, and ethyl alcohol are preferable.

Although any mole ratio of allyl halide to 3-hydroxy-2-methyl-4-pyrone will result in the formation of some of the desired product, a ratio of at least one mole of allyl halide to 3-hydroxy-2-methyl-4-pyrone is preferred.

The practice of the present invention is illustrated by the following example.

*Example*

Into a 5-liter round-bottomed flask equipped with a reflux condenser, stirrer, and thermometer were placed 226 grams (1.78 moles) of 3-hydroxy-2-methyl-4-pyrone, 256 grams (2.13 moles) of allyl bromide, 200 grams of anhydrous potassium carbonate, and one liter of acetone. The mixture was stirred and heated at the reflux temperature of 58° C. for 6 hours and then one liter of water and one liter of toluene were added. The aqueous and organic layers were separated and the aqueous layer was extracted twice with toluene. The organic solutions were combined and washed once with water, twice with 5 percent by weight aqueous sodium hydroxide solution, and once more with water. The toluene was removed by distillation under reduced pressure of about 20 mm. until a pot temperature of 100° C. was obtained. The crude product was then purified by vacuum distillation to give a yield of 166 grams (56 percent of theoretical) of 3-allyloxy-2-methyl-4H-pyran-4-one, a yellow oil boiling at 103–106° C. at 3 mm. pressure and having $n_D^{25}$ of 1.5202.

The novel compound of the present invention has demonstrated utility as a pre-emergence herbicide for *Avena fatua* (wild oats) when applied to the soil as an aqueous emulsion in a dosage of 50 pounds per acre.

The novel compound of the present invention has also demonstrated utility as a herbicide for *Echinochloa frumentacea* (Japanese millet) when employed as an aqueous emulsion in a dosage of 50 pounds per acre.

3-allyloxy-2-methyl-4H-pyran-4-one has also demonstrated utility as an aquatic herbicide for Anacharis SP (a species of waterweed) when employed as an aqueous emulsion in a dosage of 100 parts per million.

The novel compound of the present invention has demonstrated utility as a bectericide for *Micrococcus tyogenes aureus, Salmonella typhosa, Aerobactor aerogenes,* and *Erwinia carotovora* when employed in a growth medium at a concentration of 0.25 percent by weight of the toxicant-bearing culture.

The novel compound of the present invention has demonstrated utility as a fungicide for *Aspergillus terreus, Pullularia pullulous, Penicillium digitatum,* and *Rhizopus nigricans* when employed in a growth medium at a concentration of 0.25 percent by weight of the toxicant-bearing culture.

I claim:

1. 3-allyloxy-2-methyl-4H-pyran-4-one.
2. A method for preparing 3-allyloxy-2-methyl-4H-pyran-4-one, comprising, contacting 3-hydroxy-2-methyl-4-pyrone with an alkali compound selected from the group consisting of alkali carbonates and bicarbonates, an allyl halide selected from the group consisting of allyl bromide and allyl chloride, and an inert solvent, and separating the 3-allyloxy-2-methyl-4H-pyran-4-one from the reaction mixture.
3. A method as in claim 2 wherein the alkali compound is potassium carbonate.
4. A method as in claim 2 wherein the allyl halide is allyl bromide.

References Cited in the file of this patent

Hurd et al.: Jour. Am. Chem. Soc., vol. 71, pp. 2440–2443 (1949).